United States Patent [19]
Hatfield

[11] Patent Number: 4,792,429
[45] Date of Patent: Dec. 20, 1988

[54] SPRING RETENTION CAP

[75] Inventor: Stephen C. Hatfield, Granby, Conn.

[73] Assignee: Combustion Engineering, Inc., Windsor, Conn.

[21] Appl. No.: 88,435

[22] Filed: Aug. 24, 1987

[51] Int. Cl.⁴ .............................................. G21C 3/32
[52] U.S. Cl. ........................................ 376/446; 376/448
[58] Field of Search ........................ 376/446, 448, 451

[56] References Cited

U.S. PATENT DOCUMENTS 4,687,631  8/1987  Wilson ............................... 376/446
4,699,760  10/1987  Smallenberger ................. 376/446

FOREIGN PATENT DOCUMENTS 8516294  2/1986  France .............................. 376/446

Primary Examiner—Donald P. Walsh
Attorney, Agent, or Firm—John H. Mulholland

[57] ABSTRACT

An upper end fitting 14 of a nuclear fuel assembly is provided at two of its opposite corners with spring retention caps 12 having a hook-like structrue defined by an inwardly directed flange 50 engaging a slot 56 in the top nozzle or end fitting 14. The spring packs 20 are retained within the spring retention caps 12 even if one or both spring retention screws 34 break and both the broken screw portions and the springs are maintained in operative position by the cap 12 until reconstitution.

5 Claims, 3 Drawing Sheets

4,792,429

SPRING RETENTION CAP

FIELD OF THE INVENTION

This invention relates to nuclear reactor fuel assemblies and in particular those assemblies which include spaced fuel rod support grids mounted in a reactor core as a unit. The fuel rods are held between an upper end fitting or top nozzle and a lower end fitting by means of spacer grids. The reactor coolant flows upwardly from holes in the lower end fitting along the fuel rods, and upwardly through holes in the upper end fitting.

When the fuel assembly is loaded in a reactor core, an upper core plate over the fuel assembly reacts against fuel assembly holddown leaf spring assemblies attached by fasteners to the upper end fitting to provide a downward force. This force combines with the fuel assembly weight to prevent fuel assembly liftoff from hydraulic forces during operation of the reactor pumps.

BACKGROUND OF THE INVENTION

Debris in the circulating coolant which collects or is trapped in fuel rod spacer grids is believed responsible for as many as 30% of known fuel rod failures. Laboratory and in-reactor experience indicate that fuel rod cladding failures can be caused by debris trapped in a grid region which reacts against the fuel rod cladding in a vibratory fashion resulting in rapid wear of the cladding. The size and shape of the debris capable of causing severe damage is quite variable and may include broken fuel assembly fasteners.

The invention involves a spring retention cap for a nuclear fuel assembly end fitting leaf spring assembly which is designed to prevent the creation of debris, such as pieces of broken holddown spring retention screws. The cap of the invention also minimizes the loss of holddown force, the chance that a failure of one screw will impart a jacking force which leads to the failure of a second screw, and interference with control rod operation because of rotation of a leaf spring. Moreover, the cap is designed to provide simple installation and removal procedures. The cap also saves fuel reconstitution expense, because it eliminates the requirement of welds for preventing screw rotation.

More importantly, the unique cap provides the option of continuing to operate safely, without reconstitution, even if a holddown spring retention screw breaks.

SUMMARY OF THE INVENTION

The spring retention cap of the invention for a nuclear fuel assembly end fitting or top nozzle having a leaf spring assembly secured by spring retention fasteners is a body with two plane exterior surfaces defining an angled corner. The cap has a base for engaging the end fitting and a leaf spring assembly receiving slot in the base spaced from and extending substantially parallel to the two plane exterior surfaces.

An inwardly directed flange is formed at the slot opening by a portion of the base to define a connecting hook-like structure which engages a slot in each of two end fitting exterior surfaces corresponding to the two exterior plane surfaces of the cap. The base has a portion on the opposite side of the slot in the base from the flange which is inward of the hook-like structure defined by the flange. A screw secures the retention cap in position with the ends of the leaf springs and the spring retention screws covered thereby. The distance from the two spaced exterior surfaces of the body to the slot, combined with the cross-section of the screw, are sufficient to provide strength to accommodate a jacking force created by the leaf spring assembly in the event of failure of one of the two leaf spring assembly retention screws. No loading is placed on the other spring retention screw as in some other designs. If the other screw should also fracture, both leaf spring assemblies and retention screws will be captured by the cap and its attachment screw. This will preclude the creation of loose parts. If there are no problems with the spring retention screws, the only function of the cap and the third screw is to protect the spring screws and spring ends from being impacted during fuel handling operations.

PREFERRED EMBODIMENT OF THE INVENTION

Figure 1:
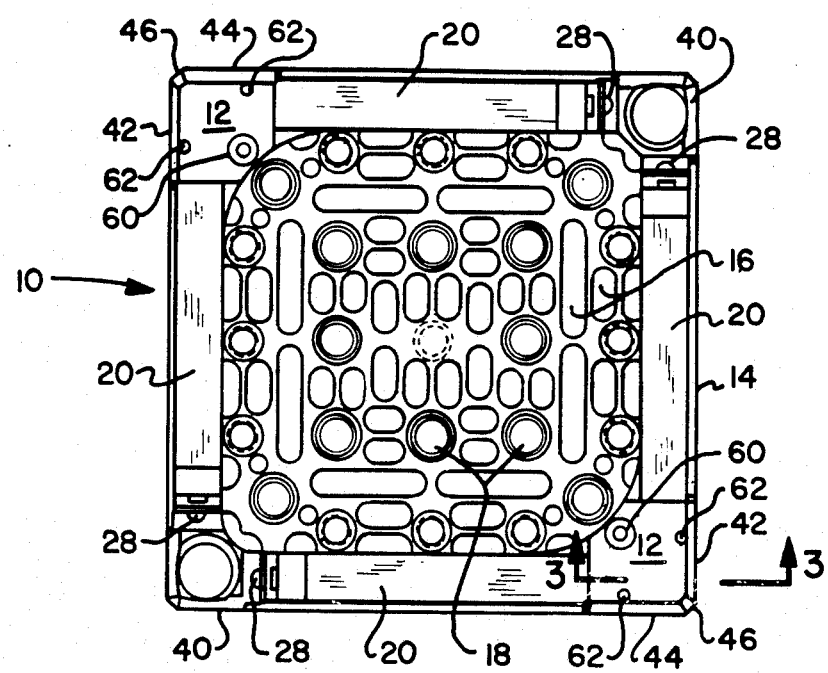
FIG. 1 is a plan view of a nuclear fuel assembly upper end fitting which includes a spring retention cap according to the principles of the invention.
Figure 2:
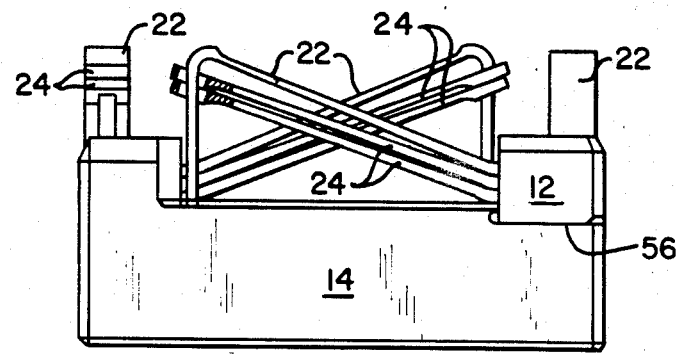
FIG. 2 is a side-elevational view of the assembly of FIG. 1.
Figure 3:
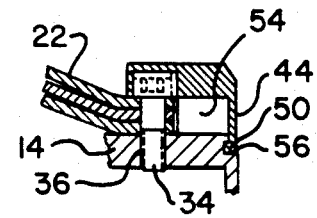
FIG. 3 is a cross-sectional view of the assembly of FIGS. 1 and 2 taken along the line 3—3 of FIG. 1.
Figure 4:
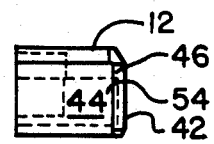
FIG. 4 is a side-elevational view of a spring retention cap of the assembly of FIGS. 1-3.
Figure 5:
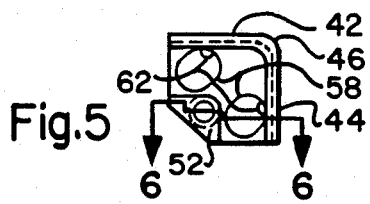
FIG. 5 is a plan view of the underside of the spring retention cap of FIG. 4.
Figure 6:
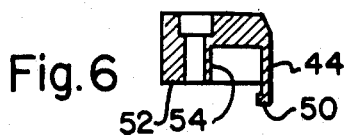
FIG. 6 is a cross-sectional view of the spring retention cap of FIGS. 4 and 5 taken along the line 6—6 of FIG. 5.
Figure 7:
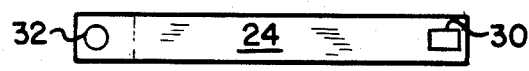
FIG. 7 is a plan view of a lower spring of the assembly of FIGS. 1-3.
Figure 8:
FIG. 8 is a side-elevational view of the spring of FIG. 7.
Figure 9:
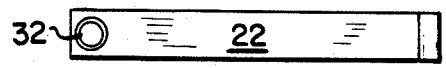
FIG. 9 is a plan view of the upper spring of the assembly of FIGS. 1-3.
Figure 10:
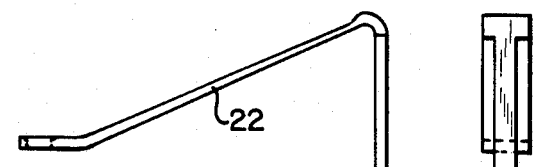
FIG. 10 is a side-elevational view of the spring of FIG. 9.
Figure 11:
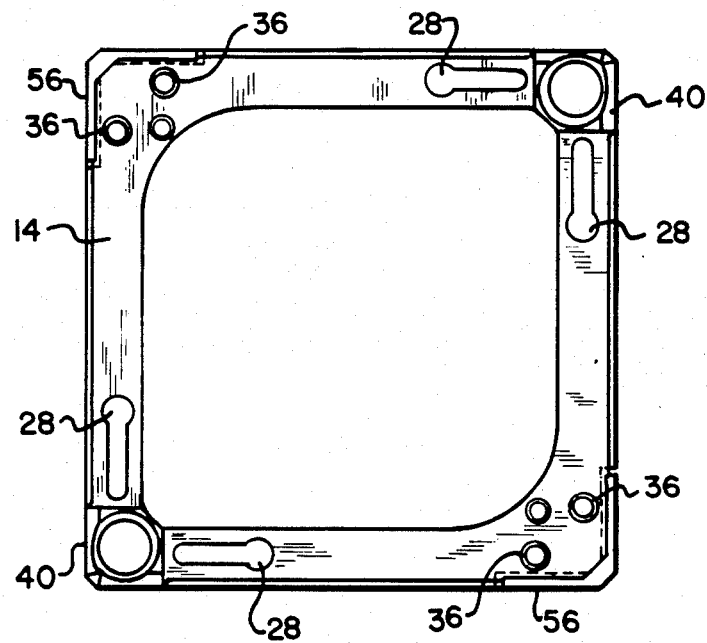
FIG. 11 is a schematic plan view of the upper end fitting or top nozzle of the assembly of FIGS. 1-3.
Figure 12:
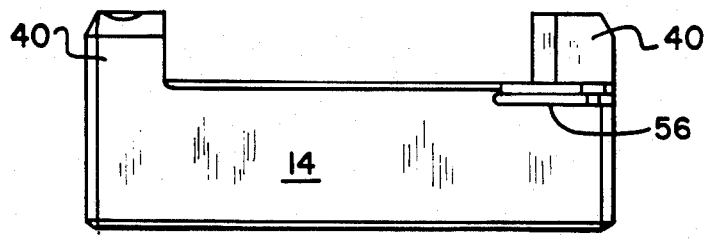
FIG. 12 is a side-elevational view of the upper end fitting of FIG. 11.

The numeral 10 generally designates a nuclear fuel assembly upper end fitting which includes a pair of spring retention caps, generally designated 12, according to the principles of the invention. The spring retention caps 12 are diagonally opposite each other on the upper surface of an upper end fitting or top nozzle 14. The top nozzle 14, as seen in plan view in FIG. 1, has a plurality of coolant flow ports 16 and openings 18 through which control rods pass in a manner known to those skilled in the art.

On the top of the nuclear fuel assembly upper end fitting, along each of its four sides, is a leaf spring pack 20 made up of upper springs 22 and a plurality of lower springs 24. The spring packs 20 have tangs 26 which insert into the top nozzle body through access holes 28 after the lower springs 24 have first had the upper spring tangs 26 inserted through the opening 30 at the upper end thereof. Each of the springs 22 and 24 have an opening 32 for receipt of a spring retention screw 34 which is tightened in a threaded bore 36 in the upper end fitting 14. The spring retention screws 34 are typically driven by hex keys and have a hexagonal opening in their head for this purpose. Once all of the spring packs 20 are assembled in this manner, the upper end fitting is ready to receive the novel spring retention cap of the invention.

The spring retention cap 12 is generally shaped in the same shape as upper end fitting posts 40 at the diagonal corners opposite therefrom. Cap 12 has two plane exterior surfaces 42 and 44 which form an angled corner 46, slightly bevelled for convenience, which corresponds to a corner formed by the side walls of the upper end fitting 14 as they converge at the upper end fitting corner below where the retention cap 12 is to be mounted. The cap 12 has a base 50,52 for engaging the end fitting 14 and a slot 54 in the base 50,52 spaced from and extending substantially parallel to the two plain exterior surfaces 42 and 44. Thus, the slot 54 is basically an L-shaped slot.

An inwardly directed flanged base portion 50 defines a connecting hook-like structure which engages a slot 56 in the corner of the upper end fitting 14 where the exterior surfaces corresponding to the two exterior plane surfaces 42 and 44 of the cap converge. The base has a portion 52 on the opposite side of the slot 54 from the flange portion 50 of the base which is inward of the hook-like structure defined by flange 50. Between the spring retention screws 34 and of slightly smaller diameter, but also with a head having a hexagonal opening, is a third screw 60 countersunk in a bore, directly opposite corner 46, running vertically through cap 12. Screw 60 secures the retention cap 12 in position with ends of the leaf spring and the spring retention screws 34 covered thereby. The spring retention screws and spring ends are thus protected from being impacted during fuel handling operations. The distance from the two plane exterior surfaces 42,44 of the body to the slot 54, and the cross-section of screw 60, are sufficient to provide strength to accommodate a jacking force which would be created by the leaf spring assembly or assemblies 20 in the event of failure of one or both of the two leaf spring assembly retention screws 34 positioned under the cap 12 in partial register with access openings 58 in the top of the cap. All of the screws 34 and 60 are provided with a crimp to prevent rotation. This eliminates the necessity of wire rotation preventing and retaining members previously used, which require welds and which can become debris in the circulating coolant of the reactor. Crimps in the heads of screws 34 are made after installing cap 12 by means of a tool inserted through access holes 62 in cap 12.

Note that the positioning of the cap 12 requires two separate motions, one to drop it vertically over the springs and screws 34, and the other slightly horizontally to move the cap hooks into the top nozzle body slots 56. The various cutaway sections of the cap 12 and nozzle body 14 are designed such that these motions are permitted with clearance between the cap and the spring packs. Thus, the distance between the base portion defined by flange 50 and that defined by the inward portion 52, on the opposite side of slot 54, is slightly larger than the width of the spring packs 20. The wall thicknesses 42, 44, the flange 50, and the screw 60, as previously stated, are of sufficient strength and stiffness to accommodate the jacking forces, if one or both of the spring retention screws 34 should break.

It is important to notice that there is normally no contact between the cap 12 and the spring packs 20 in order that this not be a source of friction that reduces the holddown force or interferes with installation. The absence of contact also eliminates differential thermal expansion, since the springs of the spring packs 20 and the spring retention screws 34 are typically made of high strength Inconel alloys and the cap 12 and the cap retention screws 60 are made from less expensive stainless steel. The spring retention screws 34 contact the cap 12 only at the crimp region as an anti-rotation measure. The cap retention screw 60 serves normally only to hold the cap 12 in position.

If one of the spring retention screws 34 should fracture, the following sequence would occur:

The spring ends of the spring pack 20 would become free to raise off the top nozzle's 14 seating surface, until the springs would contact the underside of the cap 12. The design is such that this is a very short distance. Once that contact is made, the cap "rocks" slightly until the cap 12 hooks, i.e. flanges 50 engage the edge of the slots 56 in the top nozzle or upper end fitting 14. At this point, further lifting of the spring ends is prevented by the combined action of the cap hook formed by flange 50 and the cap retention screw 60. At the same time, the head of the spring retention screw 34 is lifted by the spring pack 20. However, the vertical clearance between the underside of the cap 12 and the screw head of broken screw 34 is greater than that at the end of the spring. Therefore, the screw head is captured vertically by the cap 12, but not under a load, since this would tend to crush the portion of the screw head utilized for crimping. The cap 12 also provides lateral restraint on the screw head 34 so that the springs remain aligned both vertically and horizontally by the two pieces of the broken screw 34. Rotationally, the screw pieces act with the upper spring tang 26 and the cap edge to preclude rotation of the spring pack 20 into the path of control rods 18. None of these actions results in any loading on the other spring pack or retention screw covered by the cap.

The small movement of the spring ends relieves a portion of the spring compression in the pack in the event of the screw 34 breaking. However, most of the spring compression is retained, and based on the experience of other fuel suppliers, it is likely that only one spring pack 20 of the four in each assembly would be affected. There should normally be sufficient margin to accommodate the small loss in holddown force because the design includes added holddown force to accommodate transient conditions in reactor coolant flow. The mechanical arrangement retaining the spring pack 20 remains in effect, even if the screw 34 should break, until the reactor shuts down for refueling. At this time, the upper core plate (not shown) over the end fitting assembly 14 and spring retention caps 12 is removed and the spring compression of the spring pack 20 is relieved. The fuel assembly can be handled normally, since the cap 12, spring screw 34 pieces, and upper spring tang 26 continue to restrain the spring pack 20 from movement out of position.

The fuel assembly could be operated for additional periods since there should be no long term degradation of the components. However, if reconstitution of the broken screw 34 is desirable, the designs of the various components lend themselves to remote underwater disassembly and assembly operations. First, the cap retention screw 60 is unscrewed and removed. Its crimp is designed to be overridden with modest torque by use of a hex key and its threaded length is such that the act of unscrewing it from the top nozzle 14 raises its head above the upper surface of the cap 12. In this position, it can easily be gripped and retained by conventional tools for use in reconstitution of fuel assemblies under water. The cap 2 is moved horizontally on a 45° angle with respect to the sides of the top nozzle 14, until the cap hooks or flange 50 are disengaged from the nozzle 14. Because of the orientations of the crimps on the spring retention screws 34, they do not interfere with this movement. The cap 12 is lifted off vertically, exposing the broken screw 34 for removal and replacement. The head of the screw 34 is lifted off and then the springs can be lifted off the remaining section of the screw to expose it for removal by a gripping tool.

All components are reuseable except for the broken screw 34. The reassembly procedure would be the reverse of that just described, except that at the end, the cap retention screw 60 would be recrimped and the new spring retention screw 34 would require a crimp through access hole 62. The unbroken retention screw on the other spring pack has its crimped region returned to the original alignment with the cap and requires no new operation.

All of the above description referred to a case where one spring retention screw 34 was fractured. If both screws 34 should fracture, the same sequence of events would follow, except the reconstitution would involve both spring packs. The strengths of cap 12 and screw 60 are sufficient to accommodate the combined jacking force from both spring packs 20.

Thus, it will be seen that the components are designed to minimize the effects of broken holddown spring retention screws, which have created problems in operating fuel. The specific problems which are addressed are a loss of holddown force, creation of loose parts, the failure of one screw leading to the failure of a second, interference with control rod operation, and the expense for reconstitution.

I claim:

1. In a spring retention cap for a nuclear fuel assembly with an upper end fitting having a leaf spring assembly of a given width and including at least one spring retention fastener, the improvement comprising:
   a body for engaging the end fitting,
   two plane exterior surfaces defining a corner of said body,
   a base transverse to said corner of said body,
   a slot in said base spaced from and extending substantially parallel to said two plane exterior surfaces,
   an inwardly directed flange formed by a portion of said base and extending inwardly from said plane exterior surfaces to define a slot opening slightly larger than the given width of said leaf spring assembly,
   and means for securing said retention cap in position with an end of said leaf spring assembly and a spring retention fastener covered thereby.

2. The spring retention cap of claim 1 in which the end fitting has two plane exterior surfaces forming a corner below the corner of the cap and the flange formed by a portion of the base is dimensioned to be inserted in a slot in each of the end fitting exterior surfaces.

3. The spring retention cap of claim 1 in which a portion of the base on the opposite side of the slot in the base from the flange is inward of the flange such that the flange defines a hook-like structure.

4. The spring retention cap of claim 1 in which the distance from the two spaced exterior surfaces of the body to the slot is sufficient and the means for securing the cap is sufficiently dimensioned to provide strength to accommodate a jacking force created by the leaf spring assembly in the event of failure of the leaf spring assembly retention fastener.

5. The spring retention cap of claim 4 in which two spring retention fasteners are covered by the cap and the jacking force is accommodated in the event of failure of both fasteners.

* * * * *